No. 737,194. Patented August 25, 1903.

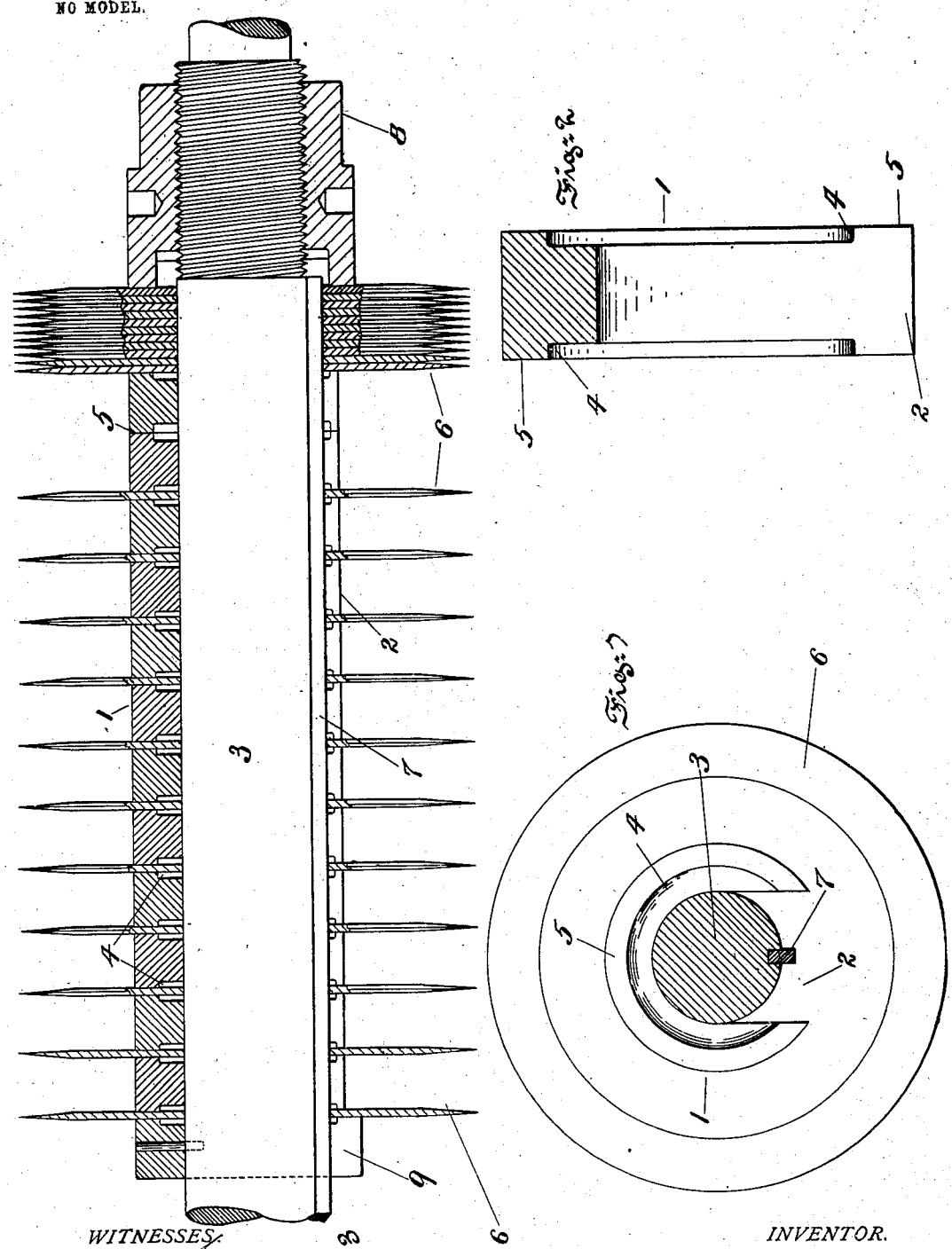

UNITED STATES PATENT OFFICE.

HARRY Y. ARMSTRONG, OF ELGIN, ILLINOIS, ASSIGNOR TO THOS. MILLS & BRO., OF PHILADELPHIA, PENNSYLVANIA, A CORPORATION OF PENNSYLVANIA.

MEANS FOR ADJUSTABLY SPACING DISK CUTTERS.

SPECIFICATION forming part of Letters Patent No. 737,194, dated August 25, 1903.

Application filed March 14, 1903. Serial No. 147,751. (No model.)

*To all whom it may concern:*

Be it known that I, HARRY Y. ARMSTRONG, a citizen of the United States, residing at the city of Elgin, in the county of Kane and State of Illinois, have invented certain new and useful Means for Adjustably Spacing Disk Cutters, of which the following is a specification.

The object of the present invention is to provide comparatively inexpensive and efficient means whereby disk cutters may be spaced farther apart or nearer together without removing them from their shaft and in an easy and expeditious manner.

To this and other ends hereinafter set forth the invention stated in general terms comprises U or horseshoe shaped spacers adapted to straddle the cutter-shaft and be clamped by and between the disk cutters, so that when loosened the spacers may be easily removed and replaced by others to separate the disk cutters more or less widely from each other as desired, and the invention further comprises the improvements to be presently described and finally claimed.

The nature, characteristic features, and scope of the invention will be more fully understood from the following description, taken in connection with the accompanying drawings, forming part hereof, and in which—

Figure 1 is a view illustrating in elevation a spacer embodying features of the invention and showing also a disk cutter and the cutter-shaft in section. Fig. 2 is a view drawn to an enlarged scale and illustrating a spacer in transverse section; and Fig. 3 is a view, partly in central section, illustrating a series of the spacers in application to a cutter-shaft and its cutters.

In the drawings, 1 is a U or horseshoe shaped spacer. As shown, it is semicircular on its inside rim and generally circular on its outside rim, there being an open space at 2, so that the spacer can be easily caused to straddle the cutter-shaft 3 and to be removed or permitted to drop from it. On its faces the spacer is shown as concave or cut away at 4, thus leaving bearings, as at 5, for the disk cutters 6. In use a series of spacers of different thicknesses may be employed or the spacers may be made comparatively thin and used in groups of varying number, the purpose being to provide for spacing the cutters at varying distances apart, as may be required.

As is well known, the cutters 6 are provided with central openings through which the shaft 3 passes, so that they may be moved endwise of the shaft, and there is provided a nut 8, screwed onto the shaft 3 and adapted to press the cutters and spacers between it and a stop 9, fixed to the shaft 3, so that the cutters and shaft revolve together. When the nut 8 is screwed up, the spacers are clamped between the cutters or by loosening the nut the spacers are permitted to drop off from the shaft or may be removed therefrom. Then the cutters may be shifted to any required distances apart and spacers of proper thickness or a group of spacers making up the proper thickness inserted on the shaft between them. The nut can then be tightened and thus the cutter as a whole made ready for use. If some of the cutters are not required, they can be shifted together in a group at one end of the shaft, and such a group is shown at the right-hand side in Fig. 3. As illustrated in the drawings, there is a key 7 interposed between the cutters and the shaft. This key permits the cutters to be moved endwise of the shaft and when present serves to positively insure their rotation with it; but, as has been explained, the presence of the key is not essential, and it would be used principally where very heavy work was to be done.

Of course the described spacers may be advantageously used in connection with any disk cutters, but their use is particularly desirable in connection with machines intended for cutting candy and the like, because in that art it is necessary to make frequent adjustments of the cutters, so as to cut strips of greater or less width.

It will be obvious to those skilled in the art to which my invention appertains that modifications may be made in detail without departing from the spirit thereof. Hence I do not limit myself to the precise construction and arrangement of parts herein; but, Having thus explained my invention, what I claim as new, and desire to secure by Letters Patent, is—

1. Means for adjustably spacing disk cutters, which comprise U or horseshoe shaped spacers separate from the cutter and adapted to straddle the cutter-shaft and be clamped by and between the disk cutters, substantially as described.

2. Means for adjustably spacing disk cutters which comprise U or horseshoe shaped spacers having their faces concaved at their centers to provide bearings for the disk cutters, substantially as described.

3. Means for adjustably spacing disk cutters which comprise U or horseshoe shaped spacers separate from the cutters and having their inner edges semicircular, substantially as described.

4. In combination a shaft provided with a stop and a nut, disk cutters mounted on the shaft and slidable endwise thereof, and horseshoe-shaped spacers separate from the cutters and adapted to straddle the shaft and be clamped by and between the cutters, substantially as described.

In testimony whereof I have hereunto signed my name.

HARRY Y. ARMSTRONG.

In presence of—
C. F. WM. SCHULTZ,
H. F. PERSCHMANN.